United States Patent
Feng et al.

(10) Patent No.: US 7,769,359 B2
(45) Date of Patent: Aug. 3, 2010

(54) ADAPTIVE WIRELESS RECEIVER

(75) Inventors: Dong Feng, Santa Clara, CA (US); Jiwei Chen, Santa Clara, CA (US)

(73) Assignee: O2Micro International Ltd., Georgetown (KY)

( * ) Notice: Subject to any disclaimer, the term of this patent is extended or adjusted under 35 U.S.C. 154(b) by 567 days.

(21) Appl. No.: 11/805,312

(22) Filed: May 23, 2007

(65) Prior Publication Data

US 2007/0287402 A1    Dec. 13, 2007

Related U.S. Application Data

(60) Provisional application No. 60/811,902, filed on Jun. 8, 2006.

(51) Int. Cl.
*H04B 1/16* (2006.01)

(52) U.S. Cl. ........................... 455/302; 455/307

(58) Field of Classification Search ............ None
See application file for complete search history.

(56) References Cited

U.S. PATENT DOCUMENTS

2004/0038649 A1* 2/2004 Lin et al. ............... 455/130
2004/0218576 A1* 11/2004 Imagawa et al. .......... 370/342

* cited by examiner

*Primary Examiner*—Thanh C Le
(74) *Attorney, Agent, or Firm*—Wang Law Firm; Li K. Wang

(57) ABSTRACT

An adaptive wireless receiver and method thereof is disclosed in the present invention. The receiver includes an antenna, a bandpass filter, a front-end unit and a demodulator. Elements inside the front-end unit can be reused when the receiver operates in a zero intermediate frequency (ZIF) mode and in a low intermediate frequency (LIF) mode. The front-end unit includes a first and second down-conversion mixer, an analog filter, a first and second analog-to-digital converter (ADC), and a digital filter.

20 Claims, 5 Drawing Sheets

ADAPTIVE WIRELESS RECEIVER

RELATED APPLICATION

This application claims the benefit of U.S. provisional application, titled Adaptive Wireless Receiver, Ser. No. 60/811,902, filed on Jun. 8, 2006, the specification of which is incorporated herein in its entirety by this reference.

BACKGROUND OF THE INVENTION

1. Field of the Invention

The present invention relates to wireless communication systems and in particular to an adaptive wireless receiver that supports multiple standards and/or multiple frequency bands.

2. Description of the Related Art

Currently, the increase demand for wireless communication systems has resulted in continuing development of wireless receivers. The receivers are commonly employed in radio frequency (RF) signal transmission. In the wireless communication field, the receivers usually are capable of receiving RF signals through an antenna. The receivers convert these RF signals to desirable intermediate frequency (IF) signals before they are converted to a baseband frequency. These IF signals are then transferred to their destinations where the IF signals will be used.

FIG. 1 illustrates a block diagram of a prior art receiver 100. The receiver 100 usually is composed of an antenna 110, a bandpass filter (BPF) 120, a RF front-end unit 130, a demodulator 140 and a processor 150. After being received by the antenna 110, RF signals are filtered by the BPF 120. The RF front-end unit 130 performs the tasks of down-translating the RF signals from high frequency to a specific IF, i.e., a low frequency. The demodulator 140 will demodulate the IF signals from the RF front-end unit 130 and the processor 150 will further process the IF signals based upon the requirements of the applications. Many topological configurations have been developed for the receivers 100 to satisfy different requirements of various applications, for example, zero IF (ZIF) receiver and low IF (LIF) receiver. The ZIF receiver and the LIF receiver are both suitable for high integration.

FIG. 2 illustrates a prior art ZIF wireless receiver 200. A RF frond-end 230 is included in the ZIF wireless receiver 200. The RF front-end unit 230 can be composed of a low noise amplifier (LNA) 231, down-conversion mixers 232 and 233, lowpass filters (LPFs) 234 and 235, analog-to-digital converters (ADCs) 236 and 237. The ZIF wireless receiver 200 can translate the received RF signal to baseband frequency centered around the DC's frequency directly with an I/Q down-conversion. The cutoff frequency of the LPFs 234 and 235 is half of that of the bandwidth of the desired channel. The ZIF wireless receiver 200 has many advantages, for example, high integration. Additionally, the output of the ZIF wireless receivers 200 is an I (in-phase) and Q (qradrature-phase) signal without any carrier signal. However, using the two LPFs 234 and 235 for channel selection in both I/Q paths requires a great silicon area, especially for low band-width and low noise applications. As a result, the complexity and cost of the integrated circuit where the ZIF wireless receiver 200 is embedded will be greatly increased. In addition, the mismatch between the I path and the Q path and a DC offset caused by the mix between the RF signal and the LO signal can adversely affect the performance of the ZIF wireless receiver 200.

FIG. 3 depicts a prior art LIF wireless receiver 300. The LIF wireless receiver 300 includes a RF front-end unit 330 that consists of a LNA 331, down-conversion mixers 332 and 333, a filter 334, a combiner 335 and an ADC 336. The LIF wireless receiver 300 translates the received RF signal to a specific lower intermediate frequency signal that is somewhat away from the baseband frequency. The filter 334 can filter out an image (i.e., reject an image) included in the IF signal. Two components of the filtered IF signal in the I and Q paths are combined (i.e., added or subtracted) by the combiner 335 and then the filtered IF signal will be converted from analog to digital by the ADC 336 and demodulated by the demodulator 140. The output of the LIF wireless receiver 300 includes a carrier signal. The combiner 335 can be included in the filter 334. In one embodiment, the filter 334 can be an image rejection filter. The main drawback for the LIF wireless receiver 300 is the low IRR (image rejection rate) caused by the mismatch between the I and Q paths, which greatly limits the performance of the receiver system.

In various applications, for example, a mobile digital TV, there are different operating standards with different natures, for example, DVB-H, T-DMB and ISDB-T. To support all these different standards, the ZIF and LIF topologies should be integrated into one single silicon circuit. However, because of the incompatibility between the ZIF and LIF topologies, more tuners are required to support these different standards in traditional solutions. Furthermore, the reuse of hardware is very limited in the traditional solutions. Hence, the performance of the receiver system is limited and the silicon area of the integrated circuit will be significantly expanded when both topologies are included.

It is thus desirous to have an apparatus and method that provide an adaptive wireless receiver supporting multiple standards and/or multiple frequency bands with reduced silicon area, simple configuration and high integration. It is to such apparatus and method the present invention is primarily directed.

BRIEF SUMMARY OF THE INVENTION

In one embodiment, there is disclosed an adaptive receiver for processing a radio frequency (RF) signal to support multiple standards. The receiver includes an antenna, a bandpass filter (BPF), a front-end unit, and a demodulator. The antenna receives the RF signal. The BPF filters the RF signal. The front-end unit processes the filtered signal from the BPF and generates digitalized signals. The demodulator demodulates the digitalized signals. The front-end unit executes channel selection when the adaptive wireless receiver operates in a zero intermediate frequency (ZIF) mode and executes image rejection when the adaptive wireless receiver operates in a low intermediate frequency (LIF) mode.

In one embodiment, there is disclosed an apparatus for converting a bandpassed (BP) radio frequency (RF) signal to a desired intermediate frequency (IF) signal. The apparatus includes a low noise amplifier (LNA), a first and second mixer, an analog filter, a first and second analog-to-digital converter (ADC), and a digital filter. The LNA amplifies the BP RF signal and generates an amplified RF signal. The first mixer converts the amplified RF signal from RF to IF and generates an in-phase (I) signal. The second mixer converts the amplified RF signal from RF to IF and generates a quadrature-phase (Q) signal. The analog filter filters the I and Q signals. The first and second ADCs convert the filtered I and Q signals from analog to digital. The digital filter filters the digitalized I and Q signals.

In another embodiment, there is disclosed a method for converting a radio frequency (RF) signal to an intermediate frequency (IF) signal by a receiver. The method includes the steps of (a) filtering the RF signal with a frequency band, (b)

amplifying the filtered RF signal, (c) down-converting the amplified RF signal to an IF signal including an in-phase (I) signal and a quadrature-phase (Q) signal when the receiver operates in a zero intermediate frequency (ZIF) mode and in a low intermediate frequency (LIF) mode, (d) filtering the IF signal, (e) converting the filtered IF signal to a digital signal including a digitalized I signal and a digitalized Q signal, and (f) filtering the digital signal.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
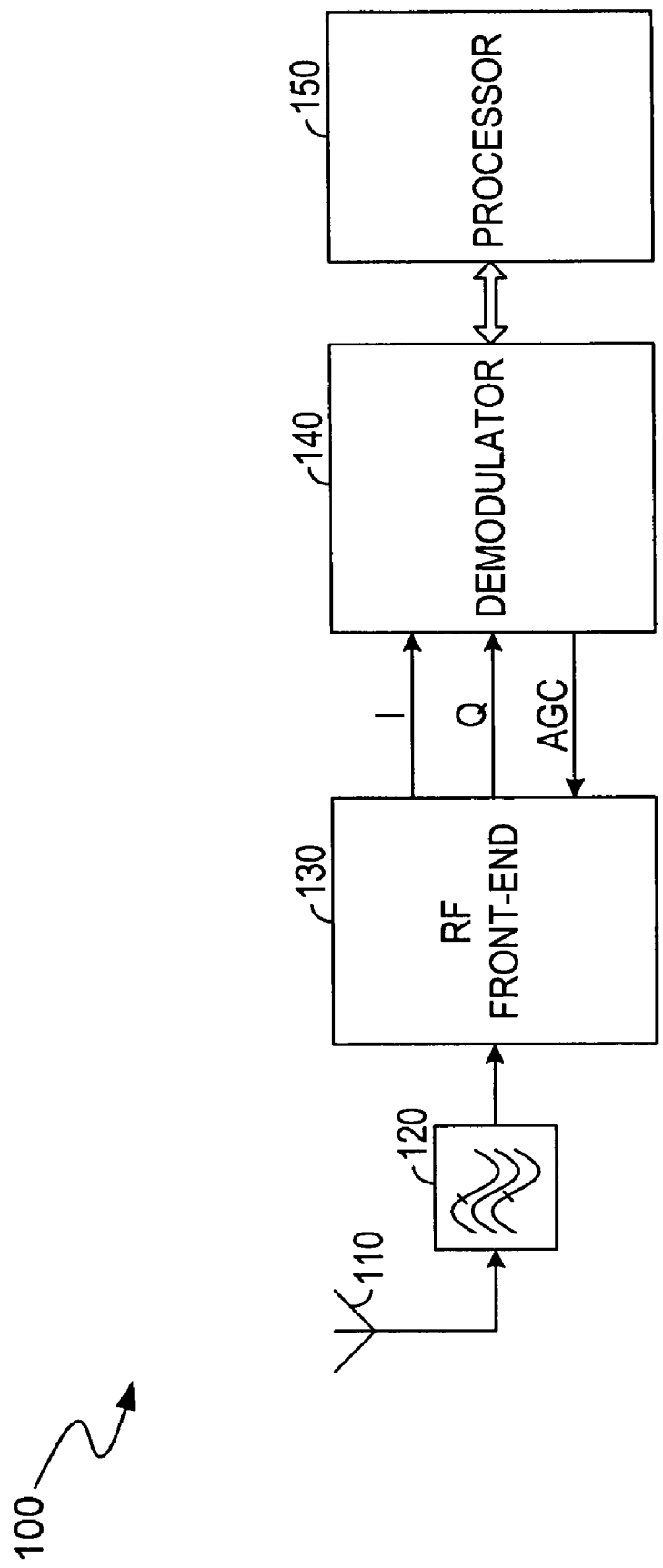
FIG. 1 is a block diagram of a prior art receiver.
Figure 2:
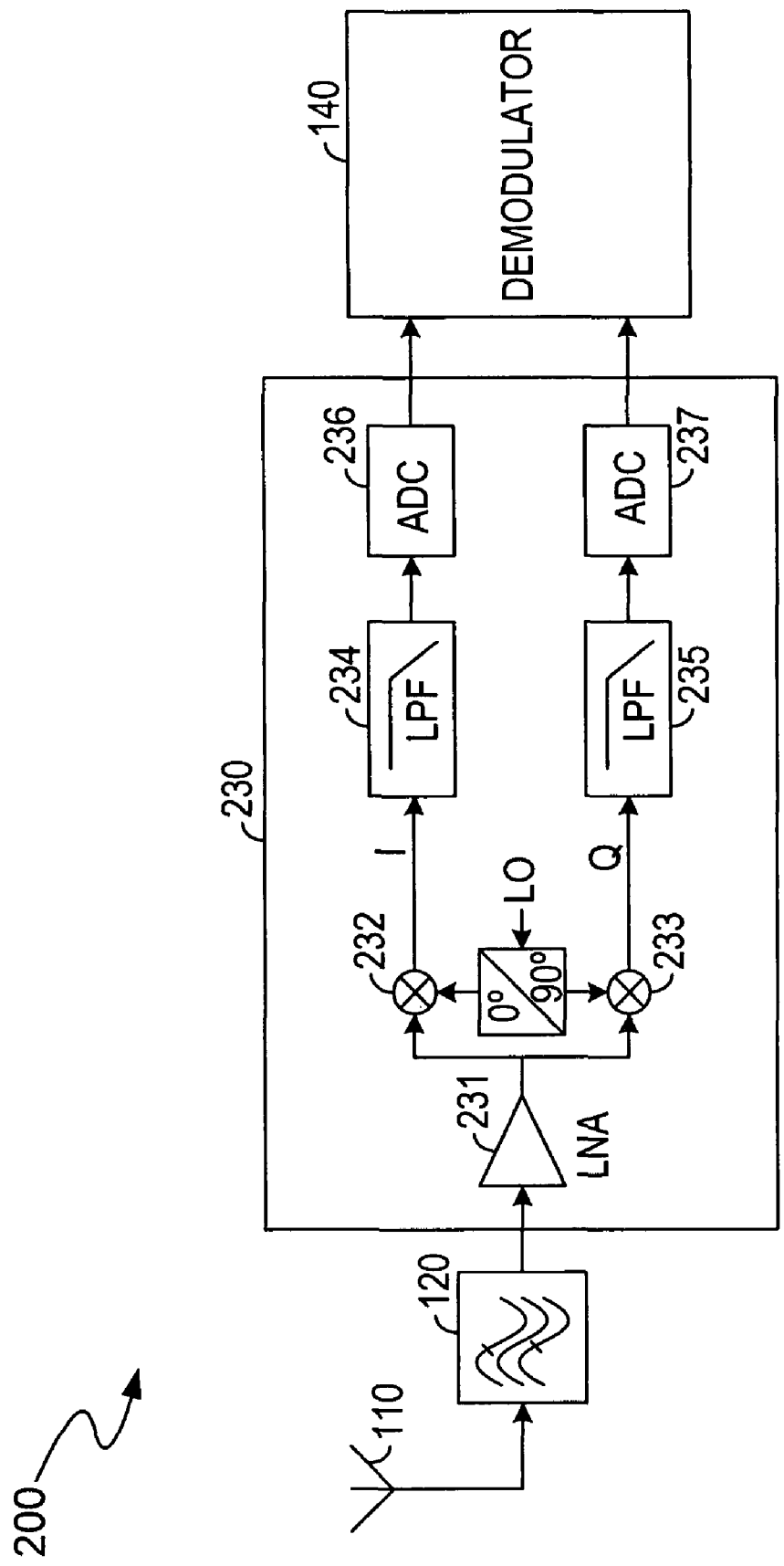
FIG. 2 is a block diagram of a prior art zero intermediate frequency (ZIF) wireless receiver.
Figure 3:
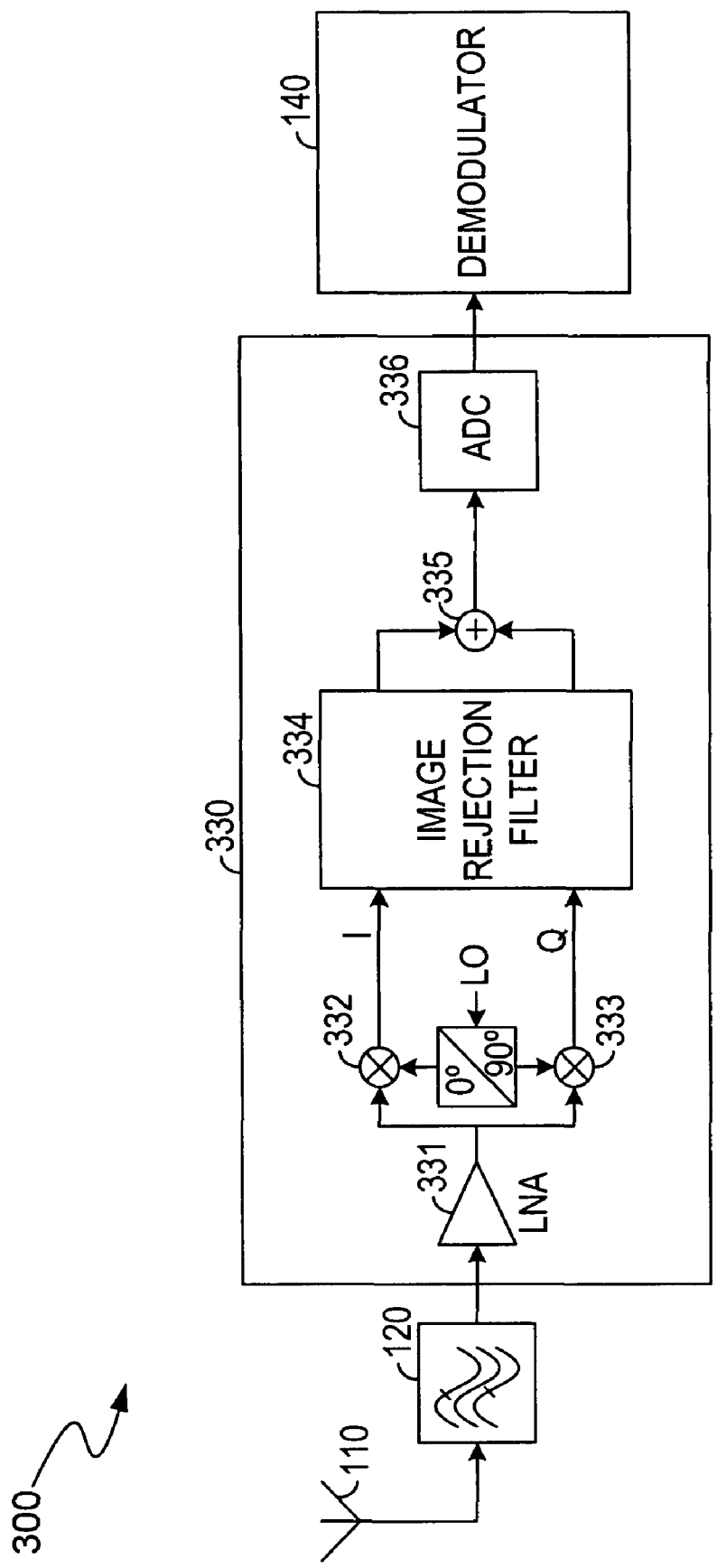
FIG. 3 is a block diagram of a prior art low intermediate frequency (LIF) wireless receiver.
Figure 4:
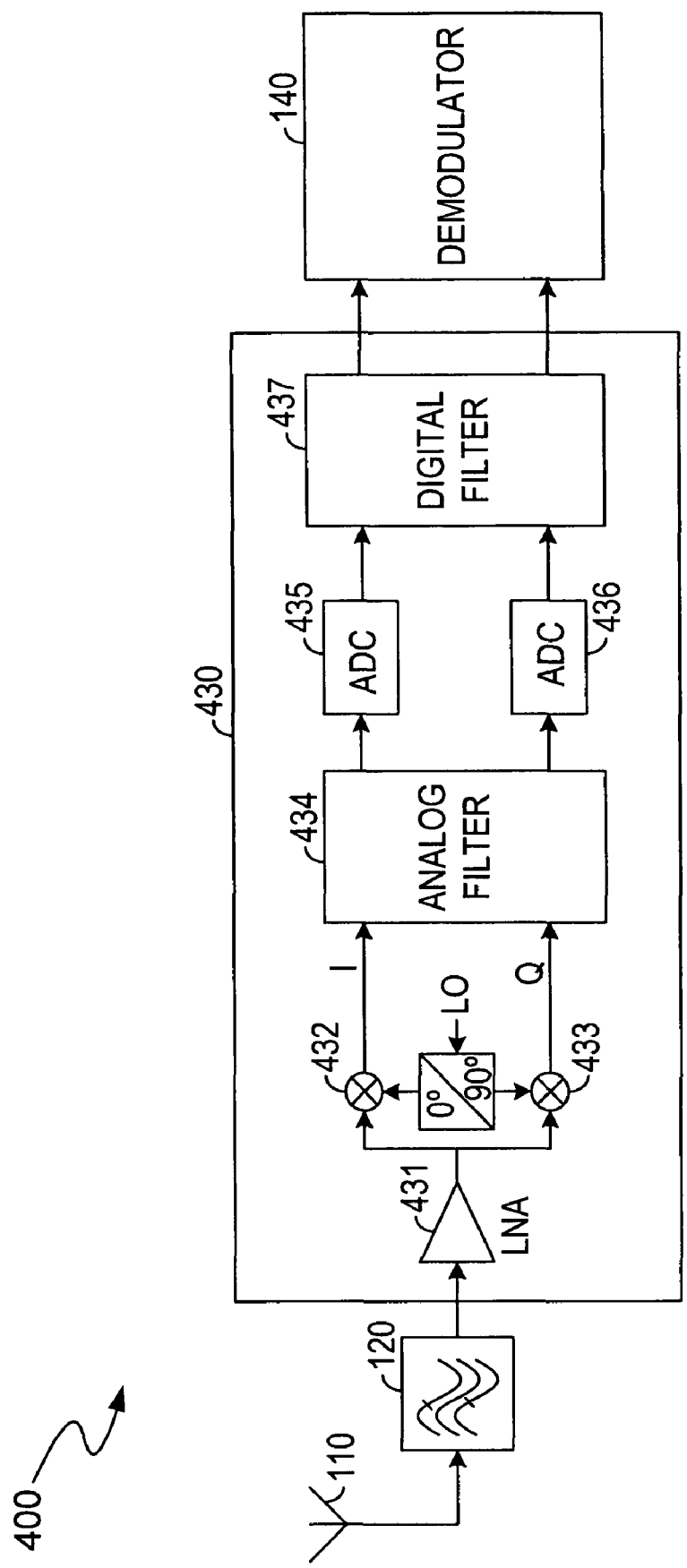
FIG. 4 is a simplified block diagram of an adaptive wireless receiver consistent with the invention.

FIG. 4 illustrates a simplified block diagram of an adaptive wireless receiver 400 according to the present invention. Because the adaptive wireless receiver 400 is similar to the ZIF (zero intermediate frequency) wireless receiver 200 and the LIF (low intermediate frequency) wireless receiver 300, the similar components thereof are indicated by similar symbols for clarity. The adaptive wireless receiver 400 described in details below can operate in both ZIF mode and LIF mode. The adaptive wireless receiver 400 is configured to support multiple standards and different frequency bands. The adaptive wireless receiver 400 includes the antenna 110, the bandpass filter (BPF) 120, a RF front-end unit 430 and the modulator 140. The RF front-end unit 430 includes a LNA (low noise amplifier) 431, down-conversion mixers 432 and 433, an analog filter 434, ADCs (analog-to-digital converters) 435 and 436, and a digital filter 437.

The antenna 110 is used to receive the RF signal from a remote location. The number of the antenna 110 is not fixed, so any number of antennas can be used based upon the requirements of different applications. Connected to the antenna 100 is the BPF 120 with a bandwidth having desired cutoff frequencies. The BPF 120 is employed for the purpose of band selection. The BPF 120 can filter the RF signal to eliminate undesired interfering signals (i.e., spurious external signals) from the RF signal with a specific frequency band. The filtered signal has a narrower band (i.e., a spectrum) where many channels are included therein. The adaptive wireless receiver 400 is capable of selecting a channel in the signal band in response to a command as will be described in detail below. The number of the BPF 120 is also not fixed, so any number of BPFs can be used according to the desired frequency band requirement for the RF signal.

The filtered signal is then delivered to the LNA 431 that can amplify the filtered signal. The amplified signal is sent to the down-conversion mixers 432 and 433. The adaptive wireless receiver 400 further includes a local oscillator (LO) (not shown) that generates a local oscillator signal. The LO signal can be adjusted accordingly by the LO. The LO signal is then mixed with the amplified signal from the LNA 431 at the down-conversion mixer 432 in an in-phase (I) path of the adaptive wireless receiver 400. In other words, the amplified signal for the LNA 431 is translated to much lower frequencies by the down-conversion mixer 432 by mixing with the LO signal from the LO. Hence, the down-conversion mixer 432 generates an IF signal in the I path that is called a down-converted I signal (i.e., an I signal) herein for abbreviation.

The phase of the LO signal from the LO is shifted ninety degrees by a unit, for example, a phase shifter. The amplified signal from the LNA 431 is also processed through a quadrature-phase (Q) path of the adaptive wireless receiver 400. Specifically, the output of the LNA 431 is inputted into the down-conversion mixer 433 that mixes the amplified signal with the phase shifted LO signal to generate a down-converted Q signal (i.e., a Q signal). The down-converted I and Q signals are separately sent from the down-conversion mixers 432 and 433 to the analog filter 434. In this embodiment, the down-converted I and Q signals form an IF signal.

If the adaptive wireless receiver 400 operates in the ZIF mode, the received RF signal is down-converted to the baseband frequency, i.e., a center frequency of 0 Hz around DC by the down-converted mixers 432 and 433. The analog filter 434 may be configured as a lowpass filter (LPF) to select a desired channel in the IF band. The signals from the analog filter 434 are converted from analog to digital by the ADCs 435 and 436. The digitalized signals from the ADCs 435 and 436 are further fed to the digital filter 437. The digital filter 437 can also be configured as a LPF to provide additional channel selection for the IF signal. The use of the digital filter 437 can greatly relax the rigorous requirement for design of the analog filter 434 and consequently the silicon area of the adaptive wireless receiver 400 may be reduced.

If the adaptive wireless receiver 400 operates in the LIF mode, the received RF signal is down-converted to a specific IF signal. The LO enables the desired channel in the band of the RF signal to be translated to a specific IF that is close to the DC. The channel adjacent to the desired channel is the image interfering the IF signal. Similar to the ZIF mode, the analog filter 434 may also be configured as a LPF for the purpose of selecting a desired channel in the band of the IF signal. The cutoff frequencies of the analog filter 434 can be selected as large as the bandwidth of the desired channel such that the silicon area of the receiver system is reduced. The channel selection can also eliminate interfering signals including the image. In other words, the analog filter 434 is configured as an image rejection filter for being capable of removing an image from a desired signal. The filtered I and Q signals are fed to the ADCs 435 and 436 for conversion from analog to digital. The digitalized I and Q signals are further fed to the digital filter 437. The image is further prevented from interfering with the desired IF signal by the digital filter 437. The digital filter 437 can be implemented as a polyphase filter.

As described before, only an analog filter is configured in a receiver for image rejection in traditional solutions. To achieve good image rejection, the circuitry design of the analog filter was very complex and therefore the cost for the receiver was significantly increased. In this embodiment, the insertion of the digital filter 437 will improve the image rejection function only implemented by an analog filter in traditional solutions. Additionally, the insertion of the digital filter 437 will relax the serious requirement for the analog filter and reduce the complexity of the receiver.

In this embodiment, the analog filter 434 can be configured as a complex filter. The digital filter 437 can also be configured as a complex filter. Whether in the ZIF mode or in the LIF mode, the filtered signal from the digital filter 437 is then delivered to the demodulator 140 where the demodulation is done. The demodulated signal can be sent to the processor 150 (not show in FIG. 4) for further signal processing to satisfy the requirements of different applications.

In order to ensure optimal signal processing, the two path, i.e., the I path and the Q path should be as identical as possible to remain path match. Accordingly, identical down-conversion mixer 432 and 433 and ADCs 435 and 436 should be used to obtain good match between the I and Q paths. This will ensure that any adverse effect caused by the elements in the I path and the Q path can be minimized.

Figure 5:
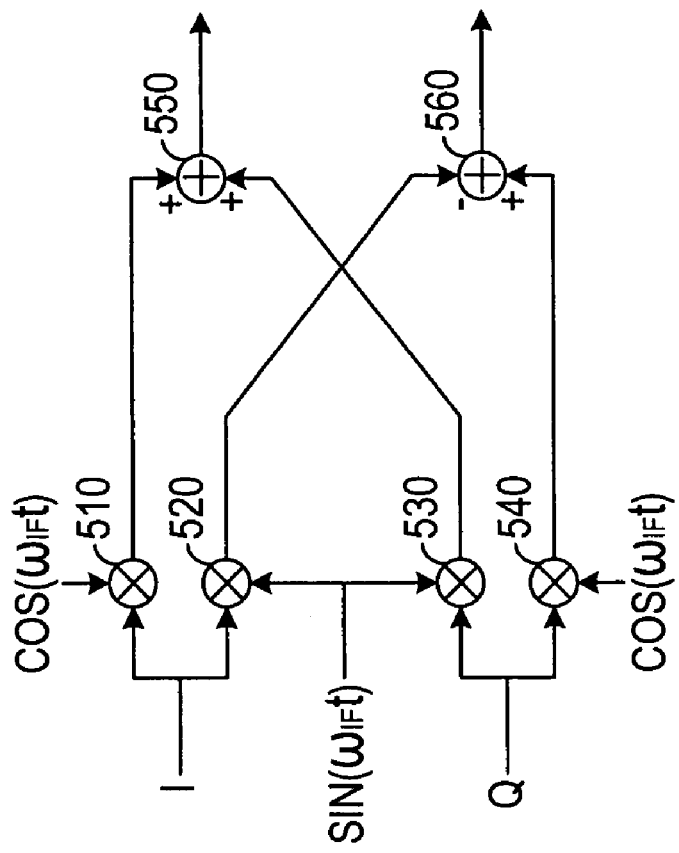
FIG. 5 is a simplified schematic diagram of a straightforward implementation of a digital image rejection function of the wireless receiver in FIG. 4.

FIG. 5 illustrates a schematic diagram 500 of an implementation of the digital image rejection function. The digital image rejection function is implemented by the digital filter 437 that mainly consists of multipliers 510, 520, 530 and 540 and adders 550 and 560. The digitalized I signal (i.e., the digitalized signal at the I path) is sent to the multiplier 510 to be multiplied by a cosine signal and the product of the multiplier 510 is then fed to the adder 550. The digitalized I signal is also sent to the multiplier 520 to be multiplied by a sine signal and the product of the multiplier 520 is then fed to the adder 560. Similarly, the digitalized Q signal (i.e., the digitalized signal at the Q path) is delivered to the multiplier 530 to be multiplied by the sine signal described previously and the product of the multiplier 530 is then sent to the adder 550. The digitalized Q signal also is fed to the multiplier 540 to be multiplied by the cosine signal described previously and the product of the multiplier 540 is then delivered to the adder 560. The product from the multiplier 510 is added to the product from the multiplier 520 and then a sum is generated by the adder 550. The product from the multiplier 520 is subtracted from the product from the multiplier 540 and then a differential value (the differential value can be called a sum) is generated by the adder 560. The sums from both adders 550 and 560 are further delivered to the demodulator 140.

In the LIF mode, the image included in the digitalized I and Q signals can be rejected through the aforementioned method, i.e., the digital filter 437 further select a desired channel from the IF band. In the ZIF mode, the digital filter 437 in FIG. 4 can further select a desired channel from the IF band through the above-mentioned method after the desired channel selection done by the analog filter 434.

In operation, the adaptive wireless receiver 400 can translate a RF signal to an IF signal in the ZIF mode and the LIF mode. The adaptive wireless receiver 400 is characterized by high integration, simple configuration and reduced cost. The antenna 110 receives the RF signal and delivers the RF signal to the BPF 120 for band selection. The BPF 120 can eliminate spurious external signals from the RF signal to prevent the spurious external signal from interfering with the RF signal. The filtered signal from the BPF 120 is then sent to the RF front-end unit 430 for further signal processing.

In the RF front-end unit 430, the LNA 431 amplifies the filtered signal from the BPF 120 and the amplified signal is then sent to the down-conversion mixer 432 and 433. The LO (not shown) included in the adaptive wireless receiver 400 generates the LO signal that can be phase shifted ninety degrees by a phase shifter. The amplified signal from the LNA 431 is mixed with the LO signal at the down-conversion mixer 432 to generate the I (in-phase) signal at the I path. The amplified signal from the LNA 431 is also mixed with the phase shifted LO signal at the down-conversion mixer 433 to generate the Q (quadrature-phase) signal at the Q path. The I and Q signals are both fed to the analog filter 434.

In the ZIF mode, the analog filter 434 is used to select the desired channel from the IF band. The ADCs 435 and 436 convert the analog signals from the analog filter 434 to the corresponding digital signals in the I and Q paths respectively.

After receiving the digital signals from the ADCs 435 and 436, the digital filter 437 selects a desired channel from the IF band.

In the LIF mode, the analog filter 434 eliminates spurious signals at image frequencies (i.e., the image) to prevent them from interfering with the desired IF signal. The filtered signals from the analog filter 434 are converted from analog to digital by the ADCs 435 and 436. The digitalized signals in the I and Q paths are sent to the digital filter 437. Because of the insufficient image rejection of the analog filter 434, the digital filter 437 is employed to further eliminate the spurious signals at the image frequencies (i.e., the image). Hence, the image is prevented to interfere with the desired signal.

The use of the digital filter 437 can overcome the signal filtering insufficiency caused by the analog filter 434 and hence relax the serious requirements to the analog filter 434. As a result, the complexity of the adaptive wireless receiver 400 is reduced and the cost thereof is greatly decreased.

Compared with the traditional solutions, the adaptive wireless receiver 400 has a high integration feature. The reuse of the hardware, for example, the analog filter 434 for channel selection in the ZIF mode and for image rejection in the LIF mode and the digital filter 437 for further channel selection in the ZIF mode and for further image rejection in the LIF mode, greatly reduces the cost of the adaptive wireless receiver 400 and enhances the integration of the circuitry system.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. An adaptive wireless receiver for processing a radio frequency (RF) signal to support multiple standards, comprising:

an antenna for receiving the RF signal;
a bandpass filter (BPF) for filtering the RF signal;
a front-end unit for processing the filtered signal from the BPF and generating digitalized signals; and
a demodulator for demodulating the digitalized signals,
wherein the front-end unit executes channel selection when the adaptive wireless receiver operates in a zero intermediate frequency (ZIF) mode and executes image rejection when the adaptive wireless receiver operates in a low intermediate frequency (LIF) mode, the front-end further comprising:
a low noise amplifier (LNA) for amplifying the filtered RF signal,
a first mixer for converting the amplified RF signal from RF to IF and generating an in-phase (I) signal,
a second mixer for converting the amplified RF signal from RF to IF and generating a quadrature-phase (Q) signal,
a single analog filter for filtering the I signal and Q signals, wherein cutoff frequencies of the single analog filter are selected as a bandwidth of a desired channel in the LIF mode,
a first analog-to-digital converter (ADC) for converting the filtered I signal from analog to digital,
a second ADC for converting the filtered Q signal from analog to digital, and
a digital filter for filtering the digitalized I and Q signals.

2. The adaptive wireless receiver of claim 1, wherein the first mixer receives a local oscillator (LO) signal from a LO and mixes the LO signal with the amplified RF signal from the LNA to generate the I signal.

3. The adaptive wireless receiver of claim 2, wherein the second mixer receives a phase shifted LO signal that is ninety degree phase-shifted from the LO signal and mixes the phase shifted LO signal with the amplified RF signal from the LNA to generate the Q signal.

4. The adaptive receiver of claim 1, wherein the single analog filter selects the desired channel from a band of an IF signal formed by the I and Q signals in the ZIF mode.

5. The adaptive wireless receiver of claim 4, wherein the digital filter executes further channel selection for the IF signal in the ZIF mode.

6. The adaptive wireless receiver of claim 1, wherein the single analog filter eliminates an image from an IF signal formed by the I and Q signals in the LIF mode.

7. The adaptive wireless receiver of claim 6, wherein the digital filter executes further image rejection for the IF signal in the LIF mode.

8. The adaptive wireless receiver of claim 1, wherein the single analog filter is a complex filter and the digital filter is a complex filter.

9. The adaptive wireless receiver of claim 1, wherein the first mixer is identical to the second mixer for path match and the first ADC is identical to the second ADC for path match.

10. An apparatus for converting a bandpassed (BP) radio frequency (RF) signal to a desired intermediate frequency (IF) signal, comprising:
    a low noise amplifier (LNA) for amplifying the BP RF signal and generating an amplified RF signal;
    a first mixer for converting the amplified RF signal from RF to IF and generating an in-phase (I) signal;
    a second mixer for converting the amplified RF signal from RF to IF and generating a quadrature-phase (Q) signal;
    a single analog filter for filtering the I and Q signals, wherein the signal analog filter executes channel selection when operating in a zero intermediate frequency (ZIF) mode and executes image rejection when operating in a low intermediate frequency (LIF) mode, and wherein cutoff frequencies of the single analog filter are selected as a bandwidth of a desired channel in the LIF mode;
    a first and second analog-to-digital converter (ADC) for converting the filtered I and Q signals from analog to digital; and
    a digital filter for filtering the digitalized I and Q signals.

11. The apparatus of claim 10, wherein the first mixer receives a local oscillator (LO) signal from a LO and mixes the LO signal with the amplified RF signal from the LNA to generate the I signal.

12. The apparatus of claim 11, wherein the second mixer receives a phase shifted LO signal that is ninety degree phase-shifting the LO signal and mixes the phase shifted LO signal with the amplified RF signal from the LNA to generate the Q signal.

13. The apparatus of claim 10, wherein the single analog filter selects the desired channel from a band of an IF signal formed by the I and Q signals and the digital filter carries out further channel selection in the ZIF mode.

14. The apparatus of claim 10, wherein the analog filter eliminates an image in an IF signal formed by the I and Q signal and the digital filter carries out further image rejection in the LIF mode.

15. A method for converting a radio frequency (RF) signal to an intermediate frequency (IF) signal by a receiver, comprising the steps of:
    (a) filtering the RF signal with a frequency band;
    (b) amplifying the filtered RF signal;
    (c) down-converting the amplified RF signal to an IF signal including an in-phase (I) signal and a quadrature-phase (Q) signal when the receiver operates in a zero intermediate frequency (ZIF) mode and in a low intermediate frequency (LIF) mode;
    (d) filtering the IF signal by a single analog filter, wherein the filtering step further comprising selecting cutoff frequencies of the single analog filter as a bandwidth of a desired channel in the LIF mode;
    (e) converting the filtered IF signal to a digital signal including a digitalized I signal and a digitalized Q signal; and
    (f) filtering the digital signal.

16. The method of claim 15, wherein the step (c) further comprising the steps of;
    mixing the amplified RF signal with a local oscillator (LO) signal;
    generating the I signal according to a mix resulting from mixing the amplified RF signal and the LO signal:
    mixing the amplified RF signal with a phase-shifted LO signal that is ninety degree phase-shifted by the LO signal; and
    generating the Q signal according to the mix between the amplified RF signal and the phase-shifted LO signal.

17. The method of claim 15, wherein the step (d) further comprising:
    selecting the desired channel from a band of the IF signal in the ZIF mode.

18. The method of claim 17, wherein the step (f) further comprising:
    executing further channel selection for the IF signal in the ZIF mode.

19. The method of claim 15, wherein the step (d) further comprising:
    eliminating an image from the IF signal in the LIF mode.

20. The method of claim 19, wherein the step (f) further comprising:
    executing further image rejection for the IF signal in the LIF mode.

* * * * *